(No Model.)
D. WILSON.
KEY SEAT RULE.
No. 510,494. Patented Dec. 12, 1893.
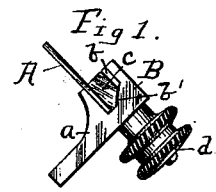
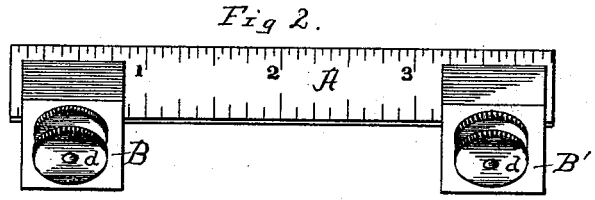
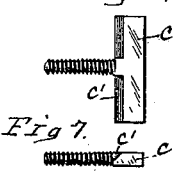
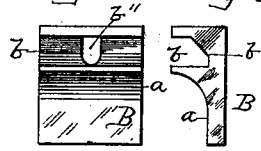
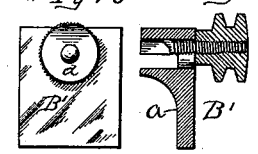
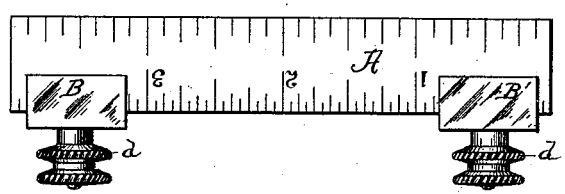
WITNESSES:
L. C. Leoty.
Robert Douthitt.
INVENTOR
David Wilson,
BY
Toulmin & McCarty
ATTORNEYS.
THE NATIONAL LITHOGRAPHING COMPANY,
WASHINGTON, D. C.

UNITED STATES PATENT OFFICE.

DAVID WILSON, OF DAYTON, OHIO.

KEY-SEAT RULE.

SPECIFICATION forming part of Letters Patent No. 510,494, dated December 12, 1893.

Application filed March 3, 1893. Serial No. 464,605. (No model.)

*To all whom it may concern:*

Be it known that I, DAVID WILSON, a citizen of the United States, residing at Dayton, in the county of Montgomery and State of Ohio, have invented certain new and useful Improvements in Key-Seat Rules; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in key-seat rules for drawing parallel lines on shafts for key-seats, mortises, &c.

The object of my invention is to provide a key-seat rule consisting of a single scale or blade secured in clamps, the said clamps having a capacity to fit rules of various lengths and widths.

The improved feature of my device consists in providing clamps for holding a single straight edge rule and adapting it, in connection with said clamps, to serve the purposes for which two straight edges are used.

My improvement is also capable of other uses, and it may properly be termed a combined gage, caliper and key-seat rule. In using the device as a caliper the clamps may be adjusted to measure the diameter of flat or square stock on either side of the rule. For the purposes of a depth gage for determining the distances from top to bottom surfaces, or from edge to edge, the clamps are placed on the opposite edges of the rule as shown in Fig. 5.

In the drawings: Figure 1. is an end view of my improved key-seat rule to show its position when used upon a shaft to draw parallel lines; Fig. 2. a longitudinal elevation with the clamps and rule occupying the inclines shown in Fig. 1. Fig. 3. a detached, detail view of the knurled adjusting screw head; Fig. 4. a detached, detail side elevation of the same; Fig. 5. a longitudinal elevation with the clamps occupying a position adapting my improved keyseat rule to the purposes of a depth gage; Fig. 6. a detached, detail view of the adjustable gib plate having the screw-threaded stem; Fig. 7. an edge view of the same; Fig. 8. a detached, detail plan view of the clamp with the gib plate having the screw-threaded stem removed; Fig. 9. an edge view of the same; Fig. 10. a rear elevation of the clamp with the adjustable gib plate and screw in place; Fig. 11. a vertical section through the center of Fig. 10. Fig. 12. is a horizontal elevation of my improved key-seat rule, showing the rear or side that may be used for the purposes of a caliper gage.

The same letters of reference denote the same parts in the different views.

A represents a rule having graduations in inches and fractional parts thereof from eighths to sixteenths and may be varied of course as desired.

B and B' are improved clamps, concaved as at $a$ in a manner to conform to the rounded surface of a shaft or other cylindrical body against which the device is placed to strike a parallel line thereon. This clamp is provided with a transverse recess as at $b$ which terminates in an incline $b'$ and aperture $b''$. Through this aperture, the screw-threaded stem of the adjustable gib plate $c$, extends. This adjustable gib plate $c$ has an inclined lower surface as at $c'$ which is adapted to bear against the incline $b'$ of the clamp.

$d$ is a screw-head to fit the stem of the plate $c$ and it will be seen that by tightening said screw-head against the clamp the adjustable plate $c$ is brought rigidly against the rule by virtue of the inclined parts of the clamp. It will also be noted that the clamps herein described are not confined to a rule of any particular length, width or thickness, but may be attached to any straight edge or rule; this utility manifestly avoids the necessity of having a variety of two edges or box squares to strike lines of different lengths.

Having described my invention, I desire to claim and secure by Letters Patent—

1. In a key-seat rule, the combination with a graduated straight edge or rule, of an adjustable clamp, having a concaved surface, and a recessed portion terminating in an incline and an aperture, an adjustable gib plate with a screw-threaded stem adapted to penetrate said aperture, a screw-head to receive said stem and effect an adjustment of the plate against the rule, substantially as and for the purposes specified.

2. The herein described key-seat rule, consisting of a single rule in combination with the adjustable clamps B and B', the adjustable gib plate c and the screw-head d by means of which the rule is secured within said clamps, substantially as described.

In testimony whereof I affix my signature in presence of two witnesses.

DAVID WILSON.

Witnesses:
GEORGE H. WOOD,
RICHARD J. MCCARTY.